United States Patent
Wilson, Sr.

(10) Patent No.: US 6,624,232 B2
(45) Date of Patent: Sep. 23, 2003

(54) PAVEMENT SEALING COMPOSITION AND METHOD OF APPLICATION

(75) Inventor: Jack H. Wilson, Sr., Jackson, MS (US)

(73) Assignee: Polycon Systems, Inc., Englewood, CO (US)

( * ) Notice: Subject to any disclaimer, the term of this patent is extended or adjusted under 35 U.S.C. 154(b) by 50 days.

(21) Appl. No.: 09/784,178

(22) Filed: Feb. 16, 2001

(65) Prior Publication Data

US 2002/0115775 A1 Aug. 22, 2002

(51) Int. Cl.$^7$ .............................. C08J 5/10; C08K 3/34
(52) U.S. Cl. ..................... 524/493; 524/492; 524/494; 524/424; 523/150; 523/157; 523/172
(58) Field of Search ................. 524/424, 492, 523/493, 494; 523/150, 152–158, 172

(56) References Cited

U.S. PATENT DOCUMENTS

| | | |
|---|---|---|
| 4,020,211 A | 4/1977 | Eigenmann |
| 4,172,063 A | 10/1979 | O'Brill |
| 4,202,857 A * | 5/1980 | Lowe .......................... 264/333 |
| 4,630,963 A | 12/1986 | Wyman |
| 4,789,265 A | 12/1988 | Wilson |
| 4,906,126 A | 3/1990 | Wilson |
| 4,917,533 A | 4/1990 | Wilson |
| 5,021,476 A | 6/1991 | Pinomaa |
| 5,079,095 A | 1/1992 | Reed |
| 5,352,279 A * | 10/1994 | Fusi et al. ................. 106/19 B |
| 5,362,178 A | 11/1994 | Schantz |
| 5,422,162 A | 6/1995 | Passarino |
| 5,472,737 A | 12/1995 | Anders |
| 5,494,741 A | 2/1996 | Fekete |
| 5,735,952 A | 4/1998 | Wilson, Sr. |
| 5,980,664 A | 11/1999 | Wilson, Sr. |
| 6,020,073 A * | 2/2000 | Wilson, Sr. ................. 428/489 |

FOREIGN PATENT DOCUMENTS

JP    2000-247704    * 9/2000

* cited by examiner

Primary Examiner—James J. Seidleck
Assistant Examiner—U. K. Rajguru
(74) Attorney, Agent, or Firm—Merek, Blackmon & Voorhees, LLC

(57) ABSTRACT

A pavement sealing composition and method of application of the sealant to pavement to form a thin coating which protects the pavement, particularly asphalt from the harmful effects of oxidation, water, ice and snow as well as fluids spilled onto the pavement surface from automobiles and aircraft. Preferably, the coating is formed of a combination of materials including a polymer resin, fine sand and Portland cement.

To this combination, a defoaming agent is added along with a preservative, pigment, a quick drying agent and water. This formulation provides for a thin protective layer which can be returned to service in a short period of time.

16 Claims, 1 Drawing Sheet

US 6,624,232 B2

PAVEMENT SEALING COMPOSITION AND METHOD OF APPLICATION

FIELD OF THE INVENTION

The present invention relates to pavement coating compositions and methods of application of the composition to pavement.

BACKGROUND OF THE INVENTION

A very large industry has existed for many years in the U.S. referred to as "The Asphalt Sealing Industry". This industry's primary function is to apply a protective sealant such as a coal tar sealant to new and old asphalt surfaces to retard oxidation and further to protect the asphalt surface from the damaging effects of fluids as water and those emitted from an automobile. Oxidation causes severe deterioration in asphalt surfaces, if the surface is left unprotected. In those parts of the U.S. experiencing ice and snow, unprotected asphalt can and often will be severely damaged by the melting snow and ice. Further damage is caused to unprotected asphalt by substances such as salt employed to accelerate melting of snow and ice. Automotive fluids such as brake fluid, oil, gasoline, diesel fuel etc. leaking from automobiles also have a significant adverse effect on the longevity of unprotected asphalt surfaces. Automotive fluids of the type identified above along with the oxidation process cause unprotected asphalt to ravel and pot holes to form. The Asphalt sealing industry emerged in large part to overcome the undesirable deterioration of unprotected asphalt. Sealant contractors in this industry have for many years contracted with various individuals and businesses to apply coal tar sealants to asphalt surfaces to prevent deterioration. Coal tar sealants are generally effective but there are a number of disadvantages attendant their application and use. For example, the application of a coal tar sealant by spray equipment allows particles to become airborne and thereby soiling workers, buildings and numerous other animate and inanimate objects. Coal tar sealants also have a significant tracking problem. This is due in large part to the prolonged curing period attendant spray application of the coal tar sealant. The tracking problem is particularly troublesome for restaurant and/or fast food proprietors because the sealant is tracked into the establishment. Another disadvantage attendant coal tar sealants is the very strong odor. This undesirable odor compounds the tracking problem in that not only is the establishment soiled by the material but the odor as well. Another important concern is the breathing of hydrocarbon vapors by workers applying the coal tar sealant. Long-term exposure to these airborne hydrocarbons may have serious health effects on the workers.

In an effort to overcome these disadvantages to coal tar sealants, attempts have been made to use other materials such as concrete to seal pavement surfaces such as parking lots. However, thin layers of concrete without polymer modification are subject to brittleness which allows an unacceptable amount of chipping and cracking and has an unacceptable time for curing prior to being put back in to service. Even prior formulations of polymer modified concrete are unacceptable in situations, which demand a quick return to service, such as some roads and airports.

Therefore, it can be seen that there is a need for a polymer modified concrete formulation which overcomes the disadvantages of coal tar sealants and provides a quick return to service so that the pavement can be put back into use soon after the application of the sealant. Additional objects and advantages of the invention will become apparent upon reading of the detailed description of the invention in conjunction with the accompanying drawings.

OBJECTS AND SUMMARY OF THE INVENTION

It is an object of the invention to provide a pavement sealing composition which dries quickly so that the pavement can be returned to service soon after application of the sealant.

Another object of the invention is to provide a pavement sealing composition that can be mixed on site and applied to pavement.

Yet another object of the invention is a pavement sealing composition that can be colored and mixed on site and applied to pavement.

Yet another object of the invention is to provide a protective layer over asphalt pavement to prevent solar heating of the pavement.

Still another object of the invention is to provide a method of applying the pavement sealing composition in a thin layer.

These and other objects, uses and advantages will be apparent from a reading of the description which follows with reference to the accompanying drawings forming a part thereof.

Figure 1:
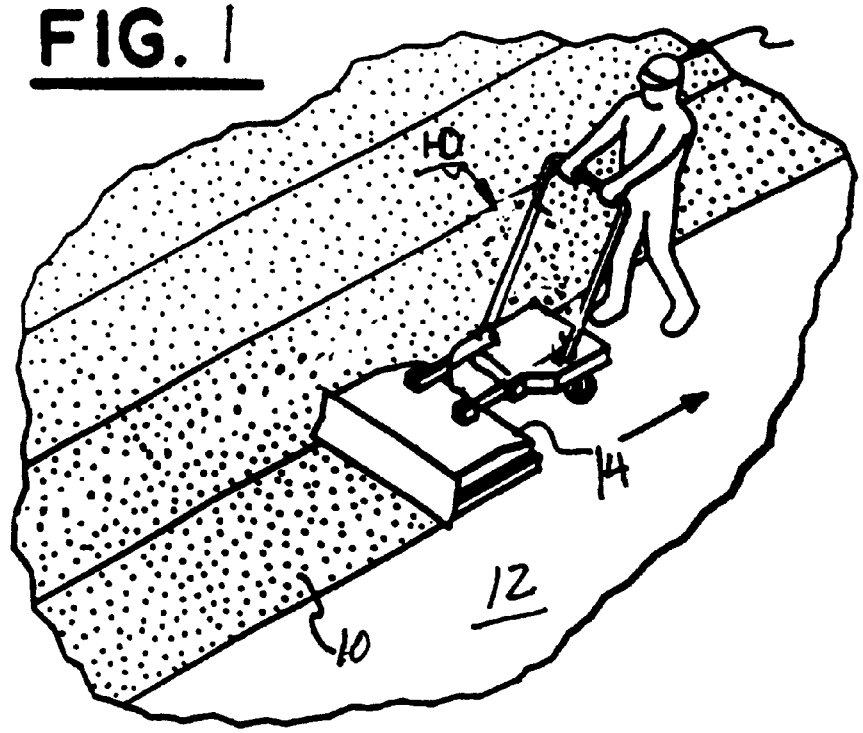
FIG. 1 is a fragmentary perspective view of the method of applying the pavement sealing composition over a pavement surface.

In summary, the invention is directed to a pavement sealing composition and method of application of the sealant to pavement to form a thin coating which protects the pavement, particularly asphalt from the harmful effects of oxidation, water, ice and snow as well as fluids spilled onto the pavement surface from automobiles and aircraft. Preferably, the coating is formed of a combination of materials including a polymer resin, fine sand and Portland cement. To this combination, a defoaming agent is added along with a preservative, pigment, a quick drying agent and water. This formulation provides for a thin protective layer which can be returned to service in a short period of time.

DETAILED DESCRIPTION OF THE INVENTION

This invention is primarily directed to the sealing of asphalt on airport tarmacs, parking lots and driveways. The sealant composition permits a very thin layer to be applied to pavement surfaces such as asphalt which when dry forms a hard and durable coating which adheres to the pavement surface and provides a high friction surface. It is an advantage of the invention to seal asphalt pavement with a light colored layer to prevent heating of the asphalt and thereby preventing rutting of the asphalt by vehicle traffic which frequently occurs when the temperature of the asphalt pavement rises on hot, sunny summer days.

The preferred formulation of the sealant includes a resin mixture including Rohm and Haas E330 liquid polymer resin to which is added 1.5 pounds of FoamBlast Defoamer by Rosschem per 100 pounds and 2.2 pounds of Nuosept preservative by Mozel per 100 pounds. These components are mixed prior to arrival at the job site. The powder portion of the composition is formed of 1 part QUIKRETE® fast setting cement and 2 parts 80 to 100 mesh silica sand (washed). The use of fine sand is very important in the sealant composition. The fine sand permits the sealant to be applied as a thin layer. QUIKRETE® fast setting cement includes a setup accelerator such as sodium carbonate which speeds up the setting and drying time. The powder portion of the composition is also preferably premixed prior to arrival at the job site.

To provide a pigmented sealant, coloring pigment may be added to either the powder or the resin. For example, 0.5 pounds of black powder pigment manufactured by Davis Colors, Inc. #860 may be added to the premixed powder to provide a black sealant. Also, KB97 liquid black pigment distributed by Eagle Sales, Inc. may be added to the resin mixture to provide a black sealant. Alternatively, black pigment may be added to both the powder mixture and the resin to provide an ultra black surface which is desirable at some airports to increase contrast from the air and make the runways easier to see for incoming aircraft. Iron oxide may be added to give the sealant a red coloring. Titanium dioxide may be used as a white coloring agent. DCC-1112 Lead Free Yellow by Azalea Color Co. may be added for a yellow coloring.

At the job site, the resin mixture is combined with the powder at the rate of one gallon of resin mixture to one 60 pound bag of premixed powder and ½ to ¾ gallon of water.

Figure 2:
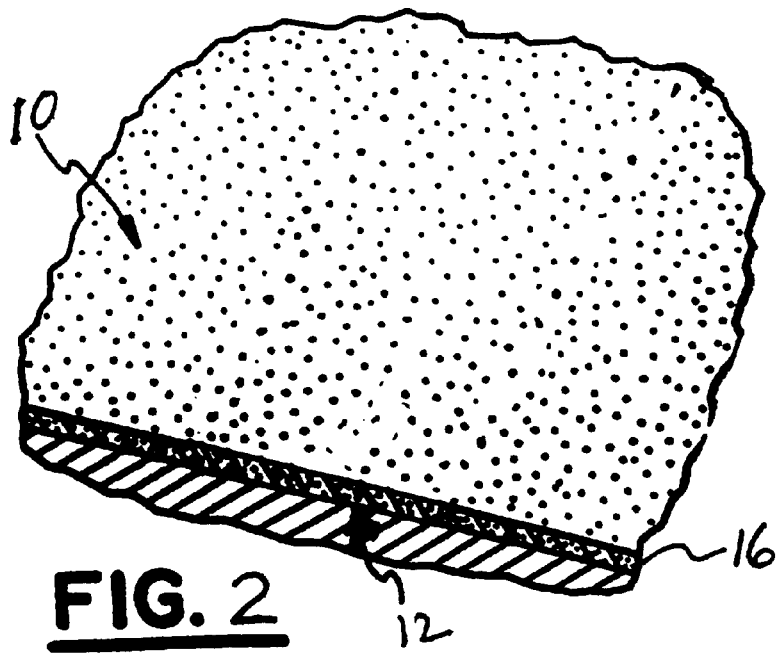
FIG. 2 is a fragmentary perspective view of the layer of pavement sealing composition in place over the pavement surface.

Now referring to FIGS. 1 and 2, the sealant composition 10 is applied to the pavement surface 12 by pouring the sealant composition onto the pavement surface 12 and quickly spreading the sealant composition 10 using a squeegee 14 to form a layer 16 of approximately 1/64 of an inch to 1/32 of an inch in thickness. It is important that the layer 16 be thin to achieve quick drying and avoid wasting of material. The sealant composition will dry in 10 to 30 minutes in 70 degrees Fahrenheit and above air and ground temperatures at this thickness and will harden to provide a durable seal over the pavement surface 12 and permit the pavement surface to be put back into service. In spreading the sealant, it is important that the squeegee 14 or trowel (not shown) not pass over the sealant composition 10 more than two times as this tends to bring the liquid to the surface thus separating the polymer resin from the sand and cement.

While this invention has been described as having a preferred design, it is understood that it is capable of further modifications, uses and/or adaptations of the invention following in general the principle of the invention and including such departures from the present disclosure as come within the known or customary practice in the art to which the invention pertains and as maybe applied to the central features hereinbefore set forth, and fall within the scope of the invention and the limits of the appended claims.

What is claimed is:

1. A polymer modified concrete composition for application to pavement surfaces, comprising:
   a) a mixture of polymer resin and a defoaming agent and a preservative blended with a powder mixture of cement and 80 to 100 mesh silica sand and sodium carbonate.
2. The composition as set forth in claim 1 further including:
   a) water.
3. The composition as set forth in claim 1 further including:
   a) pigment.
4. A polymer modified concrete sealant layer on an asphalt surface comprising:
   a) a mixture of polymer resin and a defoaming agent and a preservative blended with a powder mixture of cement and 80 to 100 mesh silica sand and sodium carbonate.
5. The layer as set forth in claim 4, wherein the mixture further includes:
   a) water.
6. The layer as set forth in claim 4, wherein the mixture further includes:
   a) pigment.
7. The layer as set forth in claim 4, wherein:
   a) said sealant layer is of a thickness of approximately between 1/64 of an inch and 1/32 of an inch in thickness.
8. The layer as set forth in claim 7, wherein:
   a) said mixture dries in 10 to 30 minutes after application.
9. A method of applying a polymer modified concrete composition onto a pavement surface comprising the steps of:
   a) pouring polymer modified concrete onto a pavement surface;
   b) spreading said polymer modified concrete into a layer of approximately 1/32 of an inch in thickness wherein the polymer modified concrete composition is formed of a mixture of polymer resin and a defoaming agent and a preservative blended with a powder mixture of cement and 80 to 100 mesh silica sand and sodium carbonate and water.
10. The method of applying a polymer modified concrete composition onto a pavement surface as set forth in claim 9, wherein:
    a) said composition is applied using a squeegee, wherein said squeegee passes over said composition not more than two times to prevent separation of said sand and said resin.
11. The composition as set forth in claim 1 wherein:
    a) said mixture includes 1.5 pounds of defoamer and 2.2 pounds of preservative per 100 pounds of resin.
12. The composition as set forth in claim 11 wherein:
    a) said powder mixture is formed of 1 part fast setting cement and 2 parts of 80 to 100 mesh sand.
13. The composition as set forth in claim 11 wherein:
    a) said resin mixture and said powder mixture are combined at the rate of one gallon of resin mixture to one sixty pound bag of premixed powder.
14. The layer as set forth in claim 4 wherein:
    a) said mixture includes 1.5 pounds of defoamer and 2.2 pounds of preservative per 100 pounds of resin.
15. The layer as set forth in claim 4 wherein:
    a) said powder mixture is formed of 1 part fast setting cement and 2 parts of 80 to 100 mesh sand.
16. The layer as set forth in claim 4 wherein:
    a) said resin mixture and said powder mixture are combined at the rate of one gallon of resin mixture to one sixty pound bag of premixed powder.

* * * * *